Patented Dec. 23, 1952

2,622,962

UNITED STATES PATENT OFFICE 2,622,962

FILAMENTARY PRODUCT AND PROCESS OF PREPARING SAME

Gottfried Ernst Rumscheidt and Johan Michael Goppel, Amsterdam, Netherlands, assignors to Shell Development Company, San Francisco, Calif., a corporation of Delaware No Drawing. Application February 20, 1950, Serial No. 145,308. In the Netherlands February 25, 1949

6 Claims. (Cl. 18—54)

The invention relates to the preparation of reaction products between polybutadiene and sulphur dioxide, which reaction products are obtained in the shape of threads or tapes. Specifically the invention relates to the preparation of such reaction products in which as an initial material polybutadiene is used which has been obtained by polymerization of butadiene in emulsion.

A process is known in which polybutadiene which has been obtained by polymerization of undiluted butadiene with sodium as a catalyst—which polybutadiene is hereinfurther referred to as sodium polybutadiene—is reacted with sulphur dioxide. The reaction product of sodium polybutadiene with sulphur dioxide may be obtained in the shape of threads, fibres, tapes or films by spinning, that is to say, by extruding a solution of the polybutadiene through a narrow orifice into a solution of sulphur dioxide. In the latter embodiment of the known process the polybutadiene must be activated by a hydroperoxide or by another oxygen yielding substance. If an oxygen yielding substance is used which is not a hydroperoxide an ether must be present too. The shape of the cross section of the obtained thread or tape is determined by the shape of the orifice through which the polybutadiene solution is extruded. A similar process is known in which natural rubber is reacted with sulphur dioxide.

Experiments have been made in which polybutadienes other than the sodium polybutadiene mentioned above were reacted with sulphur dioxide in a manner as hereinbefore described. Polybutadienes were tried made by polymerization in solution with sodium or with various peroxides as catalysts. Also polybutadienes were tried which had been prepared by polymerization using catalysts of the Friedel-Crafts type. None of these polybutadienes could be spun successfully by extruding solutions thereof (which moreover contained the above-mentioned activators) into solutions of sulphur dioxide. Only in exceptional cases a thread was formed but this was mechanically so weak, that it could not serve for any practical purpose.

Surprisingly it has been found now that threads, fibres, tapes and films of very good quality may be produced from polybutadiene obtained by polymerization in emulsion, hereinfurther referred to as emulsion polybutadiene. The reaction product of emulsion polybutadiene with sulphur dioxide is even outstandingly superior to the reaction product of sodium polybutadiene with sulphur dioxide. Threads could be made in reacting emulsion polybutadiene with sulphur dioxide having a tensile strength of 210 g./100 den. whereas the highest value of tensile strength achieved with the reaction product of sodium polybutadiene and sulphur dioxide was only 80 g./100 den. In chemical stability the reaction products of emulsion polybutadiene and sulphur dioxide are distinguished favourably not only from reaction products of sodium polybutadiene with sulphur dioxide but also from rubber-$SO_2$ reaction products. Further the new products show considerable advantages from a chemical point of view during their manufacture, as will be explained more fully hereinafter.

The emulsion polybutadiene which is to be reacted with sulphur dioxide may be prepared at elevated temperature as well as at low temperatures. The expression "low temperature" in this specification means a temperature of at most 25° C., whereas "elevated temperature" means a temperature above 25° C.

Although at either of the two temperature ranges mentioned a polybutadiene may be prepared which, if reacted with sulphur dioxide, yields products which show outstanding qualities in comparison with any previously prepared polybutadiene-sulphur dioxide reaction product, the low temperature emulsion polybutadiene for the purpose of reacting with sulphur dioxide is yet to be preferred over the emulsion polybutadiene obtained at elevated temperature. The preference for emulsion polybutadiene prepared at low temperature is due to easier spinning into the sulphur dioxide solution, easier stretching of the threads formed thereby and superior mechanical properties of the threads.

The best results are obtained when polybutadiene prepared by polymerization in emulsion at temperatures below approximately +10° C. is used as initial material. The temperatures applied in the preparation of the polybutadiene, however, may be appreciably lower than +10° C., for example 0°, —10° or even below —20° C. Reference is made to Example IV hereinfurther.

The emulsion polymerization of butadiene at low temperature is carried out according to methods which are known as such. Oxidants, such as peroxides or hydroperoxides, are used as catalysts, which—if so desired—may be combined with reducing agents. Suitable emulsifiers are soaps, for example soaps of resin acids, oleic acid or lauric acid. It is advisable to add to the emulsion to be polymerized a substance which checks the growing of the chains of the polymer or the formation of net structures, such as dodecyl mercaptan. Such substances favourably affect the solubility of the polymer and may obviate the necessity of plasticizing the polymer by rolling, a treatment which also reduces the molecular weight. Agents which reduce the freezing point, such as methanol, are added to the water phase at temperatures below 0° C.

The products obtained by reacting emulsion polybutadiene with sulphur dioxide according to the present invention are chemically more stable than those obtained from sodium polybutadiene and sulphur dioxide. The products obtained by reacting emulsion polybutadiene with sulphur dioxide are even considerably more stable than the reaction products from sulphur dioxide with rubber.

Also the stability of the reaction products of emulsion polybutadiene and sulphur dioxide is very little dependent upon the sulphur content. In this respect the products of the invention compare favourably with, e. g., rubber sulphur dioxide reaction products; the former show a constant stability irrespective of the sulphur content between 18 and 22%, whereas the latter show a very variable stability, largely depending upon the sulphur content and very unsatisfactory at sulphur contents of 14 up to 20%.

Another important advantage of the emulsion polybutadiene from a chemical point of view is that—if the polybutadiene solution and the sulphur dioxide solution are completely miscible with each other—the sulphur content of the reaction product of this polymer with sulphur dioxide is between wide limits very little dependent upon the concentration of the sulphur dioxide solution used. If the sulphur content of the reaction product is plotted against the concentration of the sulphur dioxide solution a curve is obtained, showing a steep increase of the sulphur content of the reaction product up to sulphur dioxide concentrations of 40 grammes per litre, a very weak increase of the sulphur content of the reaction product in a linear section of the curve between 60 and 180 grammes of sulphur dioxide per litre and practically no further increase of the sulphur content at concentrations of sulphur dioxide beyond 180 grammes per litre. The limits of sulphur dioxide concentrations between which there is a very weak increase of the sulphur content if the sulphur dioxide concentration is enchanced (60 and 180 grammes per litre) are practically independent of the nature and concentration of the activator used, provided that the nature and concentration of the activator and further conditions are such as to ensure substantial saturation with sulphur dioxide, that is to say a sulphur content of the reaction product of at least 19%. In contradistinction to emulsion polybutadiene the other polydienes, e. g. rubber, show a very gradual increase of the sulphur content of the reaction product over the whole range of sulphur dioxide concentrations mentioned above. Only if the concentration of sulphur dioxide is over 180 grammes per litre the reaction product with rubber contains about as much sulphur as the reaction product with emulsion polybutadiene. Reference is made to Example II hereinfurther.

The important result is that emulsion polybutadiene may be reacted with sulphur dioxide solutions of relatively low concentrations to produce reaction products of practically the same high sulphur content as are obtained when using sulphur dioxide solutions of high concentrations. Since highly concentrated sulphur dioxide solutions are cumbersome to deal with owing to the nuisance they cause to people's health and the corrosion of apparatus they involve if no special protective measures are taken, the possibility of working at low concentrations of sulphur dioxide is very advantageous.

Preferably sulphur diovide concentrations are used between 60 and 120 grammes per litre. Concentrations of sulphur dioxide up to 180 grammes per litre and even higher may be used, although concentrations over 180 are not recommended. On the other hand use may be made of concentrations of sulphur dioxide between 40 and 60 grammes per litre. Although concentrations of sulphur dioxide below 40 grammes per litre may be applied in the process of the invention such concentrations generally are less desirable because the qualities of the products obtained with such concentrations are not as good as when higher concentrations are used; moreover the qualities at such very low sulphur dioxide concentrations are rather variable on slight variation of reaction conditions.

Further, a remarkable feature of emulsion polybutadiene is that the sulphur content of its reaction product with sulphur dioxide is largely independent of temperature. No differences in sulphur content were stated when the reaction was carried out at various temperatures between —10° C. and +30° C. In these experiments solutions of polybutadiene were used which were completely miscible with the solutions of sulphur dioxide. When other polydienes, e. g. rubber, are reacted with sulphur dioxide in several experiments, each of which is carried out at a different temperature, the other conditions being the same, there is a marked decrease in the sulphur content of the reaction product according as the temperature at which the experiment is carried out is higher. The divergence starts at about +5° C. The decrease in sulphur content in case of rubber is especially very steep at temperatures beyond +12° C. Reference is made to Example III hereinfurther.

The importance of the sulphur content being independent of temperature is evident. So far, the reaction of polydienes with sulphur dioxide always was carried out under cooling in most cases to temperatures below zero, which is rather expensive. The process of the invention, on the contrary, may be carried out at room temperature; suitable temperatures are between +12 and +30° C. Lower temperatures may be applied e. g. down to +5° C. or to —15° C. or even lower. Most suitable conditions are sulphur dioxide concentrations between 60 and 120 grammes per litre combined with temperatures between +12 and 20° C.

It is primarily an object of the invention to provide a material in the shape of continuous articles such as threads, filaments or tapes, which material has excellent mechanical properties and satisfactory chemical stability. It is also an object of the invention to provide a process for the production of said material and said continuous articles. It is a further object of the invention to provide a process for reacting emulsion polybutadiene with sulphur dioxide. A further object of the invention is to provide a method of effecting the reaction between emulsion polybutadiene and sulphur dioxide under conditions so as to ensure a substantial saturation of the polybutadiene with sulphur dioxide. A still further object is selecting such conditions of the aforesaid reaction as to achieve high sulphur contents of the final products whilst using solutions of sulphur dioxide with relatively low partial sulphur dioxide vapour tension. Another object of the invention is to achieve high sulphur contents of the final products whilst using sulphur dioxide solutions of concentrations lower than necessary for the same purpose when starting from other dienes such as natural rubber. Still another object of the invention is to achieve one or more of the afore-mentioned objects whilst carrying out the said reaction at room temperature.

The following Examples I to V illustrate how the process of the invention may be carried out into effect; data about properties of products are given showing the improvement over the prior art. Examples VI to IX are added illustrating the defectiveness of process and products if initial material other than emulsion polybutadiene is used.

EXAMPLE I

In this example an emulsion polybutadiene obtained at lower temperature is compared with rubber. The recipe for the preparation of the emulsion polybutadiene is given below but does not form part of the invention.

*Preparation of low temperature emulsion polybutadiene*

An emulsion of the following composition (in parts by weight) was prepared:

| | |
|---|---|
| Butadiene | 100 |
| "Dresinate 731" (a resin soap) | 4.7 |
| Trisodium phosphate | .5 |
| Cumene hydroperoxide | .2 |
| "Sulfole B-8" (tertiary dodecyl mercaptan) | .186 |
| "Daxad 11" | .1 |
| Glucose | 2.5 |
| Sodiumpyrophosphate | .6 |
| Ferrosulphate-heptahydrate | .1 |
| Water | 180 |

Of the above ingredients glucose, sodium pyrophosphate and ferro-sulphate were added jointly, dissolved in 10.4 parts of water. This solution forms the reducing component of the catalyst system.

The polymerization was carried out at 5° C. The conversion of butadiene was 50%.

The dispersion of polybutadiene thus obtained was creamed by adding a concentrated solution of common salt and then coagulated by the addition of sulphuric acid. The coagulate was filtered off, washed and dried. To purify the coagulate it was dissolved in toluene, whereupon it was again coagulated by adding dilute ethanol.

*Reaction with sulphur dioxide*

The purified low temperature emulsion polybutadiene was dissolved in toluene to a concentration of 6.5%. Tetraline hydroperoxide was added to the solution in a quantity of 15% calculated on the weight of polybutadiene. The tetraline peroxide was added in the form of a solution of 100 g. tetraline peroxide in 1 litre of tetraline. The solution was then extruded at −7° C. through a spinnerette with fine perforations into a bath consisting of a mixture of ethanol and water in the weight ratio 4:1, in which mixture sulphur dioxide had been dissolved to a concentration of 200 g. per litre.

The reaction product was obtained in the form of threads which were washed with ethanol and then dried. The sulphur content of the dry product was 21%. The tensile strength was 110 g./100 den., the elongation at rupture was 48%.

The following tables show the great stability of the product obtained according to the invention when it is heated or irradiated. The stability is evidenced both by the slight change in mechanical properties and the splitting off of only a small quantity of sulphur dioxide. This product was compared with the reaction product of rubber with sulphur dioxide. It should be noted that the absolute values of tensile strength of polybutadiene-$SO_2$ as shown in Table I are low in comparison to the values given for rubber, because the rubber-$SO_2$ had been stretched whereas the polybutadiene-$SO_2$ had not. Stretching enhances the tensile strength considerably but practically does not affect the chemical stability.

Table I shows the influence of heating the product at 125° C. in air. The heating time was varied. Other products used for the sake of comparison were emulsion polybutadiene-$SO_2$ (prepared according to the invention in the manner described above) and rubber-$SO_2$, both impregnated with thiourea. The impregnation was carried out by soaking the thread-like products for 4 hours at 20° C. in a 2% solution of thiourea in ethanol and subsequently drying them in the air.

The stability of emulsion polybutadiene-$SO_2$ without a stabilizer was approximately equal to that of rubber-$SO_2$ which had been impregnated with the stabilizer.

TABLE I

| Material | Period of heating | Tensile strength, g./100 den. | Decline in tensile strength, percent | Elongation at rupture, percent | Decline in elongation at rupture, percent calculated on values in adjacent column |
|---|---|---|---|---|---|
| Emulsion polybutadiene-$SO_2$ | 0 | 110 | | 48 | |
| | 2 | 97 | 12 | 35 | 27 |
| | 4 | 101 | 8 | 37 | 23 |
| | 8 | 100 | 9 | 34 | 29 |
| Emulsion polybutadiene-$SO_2$, impregnated | 0 | 105 | | 50 | |
| | 2 | 105 | | 40 | 20 |
| | 4 | 104 | 1 | 39 | 22 |
| | 8 | 108 | | 40 | 20 |
| Rubber-$SO_2$ | 0 | 198 | | 15 | |
| | 2 | 161 | 19 | 9 | 40 |
| | 4 | 154 | 22 | 7 | 53 |
| | 8 | 110 | 45 | 4 | 73 |
| Rubber-$SO_2$ impregnated | 0 | 200 | | 13 | |
| | 2 | 198 | 1 | 12 | 7 |
| | 4 | 197 | 2 | 11 | 15 |
| | 8 | 182 | 9 | 11 | 15 |

Table II shows the quantities of $SO_2$ split off from polybutadiene-$SO_2$ and rubber-$SO_2$ by heating at 125° C. in air for two hours.

It also states the results obtained after impregnating the two materials with a 2% solution of thiourea in ethanol in the manner indicated for Table I, or in a similar manner with a solution of 0.75% thiourea and 0.75% hexamethylene tetramine in ethanol.

TABLE II

| Material | Impregnated with— | Percent fo SO₂ split off |
|---|---|---|
| Emulsion polybutadiene-SO₂ | — | 0.92 |
| | 2% thiourea | .02 |
| | 0.75% thiourea; 0.75% hexamethylene tetramine | .00 |
| Rubber-SO₂ | — | 2.10 |
| | 2% thiourea | .30 |
| | 0.75% thiourea; 0.75% hexamethylene tetramine | .06 |
| | | .06 |

Table III refers to the stability of the product when irradiated (a high-pressure mercury vapour tube was used).

TABLE III

| Material | Irradiation (hours) | Tensile strength g./100 den. | Decline in tensile strength, percent | Elongation at rupture, percent | Decline in elongation at rupture, percent |
|---|---|---|---|---|---|
| Emulsion polybutadiene-SO₂ | 0 | 110 | — | 48 | — |
| | 17 | 97 | 12 | 38 | 21 |
| Rubber-SO₂ | 0 | 174 | — | 13 | — |
| | 17 | 99 | 43 | 3 | 77 |

EXAMPLE II

The emulsion polybutadiene which had been prepared in accordance with the above recipe was dissolved in benzene to a solution of 3% concentration. Plasticized natural rubber was dissolved in another quantity of benzene so as to form a solution of equal concentration. To each solution a quantity of tetraline hydroperoxide was added amounting to 15% calculated on the weight of dissolved polymer. The two solutions were extruded through spinnerettes into solutions of sulphur dioxide so as to form threads. The spinnerettes contained 20 openings each of 0.09 mm. cross section. The solvent in the sulphur dioxide solution was a mixture of ethanol and water in the relative proportion of 4:1 by volume.

Table IV shows the sulphur content achieved with various sulphur dioxide concentrations. The sulphur contents of the products were determined after washing with ethanol and drying in the air at room temperature.

TABLE IV

| Sulphur dioxide in solution, grammes/litre | Percent sulphur in reaction product with— | |
|---|---|---|
| | Emulsion polybutadiene | Rubber |
| 20 | 14.7 | 1.3 |
| 40 | 18.4 | 2.5 |
| 60 | 19.7 | 4.3 |
| 80 | 20.0 | 6.8 |
| 100 | 20.3 | 9.6 |
| 120 | 20.6 | 12.8 |
| 140 | 20.8 | 16.0 |
| 160 | 21.1 | 18.9 |
| 200 | 21.5 | 21.8 |

EXAMPLE III

The emulsion polybutadiene which had been prepared in accordance with the above recipe was dissolved in toluene to a solution of 6.5% concentration. Plasticized natural rubber was dissolved in another quantity of toluene so as to form a solution of equal concentration. To each solution a quantity of 15% tetraline hydroperoxide was added, calculated on the weight of dissolved polymer. The two solutions were extruded through spinnerettes as described in Example II into solutions of sulphur dioxide in a mixture of ethanol and water. The relative proportion in the mixture of ethanol and water was 4:1 by volume. The concentration of the latter solutions was 200 grammes sulphur dioxide per litre.

Table V shows the sulphur contents achieved at various reaction temperatures. The sulphur contents were determined after washing with ethanol and drying in the air.

TABLE V

| Temperature, ° C. | Percent sulphur in reaction product with— | |
|---|---|---|
| | Emulsion polybutadiene | Rubber |
| −10 | 21.4 | 22.3 |
| −5 | 21.4 | 22.2 |
| 0 | 21.4 | 22.0 |
| +5 | 21.4 | 20.8 |
| +10 | 21.4 | 17.6 |
| +15 | 21.4 | 13.7 |
| +25 | 21.4 | — |

EXAMPLE IV

Emulsion polybutadienes, which had been prepared at various temperatures were dissolved in toluene to solutions of 6.5% concentration. To each solution a quantity of 15% tetraline hydroperoxide was added, calculated on the weight of dissolved polymer. The solutions were extruded through spinnerettes as described in Example II into solutions of sulphur dioxide in a mixture of ethanol and water. The relative proportion of ethanol and water therein was 4:1 by volume. The concentration of sulphur dioxide in the solution was 150 grammes per litre in all experiments. The temperature at which the reaction of polybutadiene with sulphur dioxide took place was +20° C. Threads were formed which were stretched while still in the swollen state, immediately after their production. For each emulsion polybutadiene the degree of stretching of the reaction product was varied so as to find out at which degree of stretching the tensile strength was the highest. Table VI gives the said maximum values of the tensile strength together with the degree of stretching at which those maximum values were achieved. Also is given the elongation at rupture of the samples which had been stretched as indicated. The tensile strength and elongation at rupture were measured after the threads had been washed with ethanol and dried in the air. The sulphur content of all products after drying was between 21 and 22%.

TABLE VI

| Temperature of preparation of polybutadiene, ° C. | Degree of stretching, percent | Tensile strength, g./100 den. | Elongation at rupture |
|---|---|---|---|
| −5 | 210 | 195 | 26.0 |
| +20 | 161 | 166 | 26.6 |
| +45 | 132 | 136 | 32.7 |
| +80 | 88 | 95 | 62.9 |

EXAMPLE V

This example is given to show the relative chemical stability of the reaction product of emulsion polybutadiene with sulphur dioxide, as compared with the reaction product of sodium polybutadiene with sulphur dioxide.

The emulsion polybutadiene and the reaction product thereof with sulphur dioxide were prepared in accordance with Example I. The sodium polybutadiene was prepared by heating butadiene, without a diluent, with 2% of sodium in a sealed tube in the absence of air at 60° C. during 10 hours. The reaction of the sodium polybutadiene with sulphur dioxide was carried out under conditions equal to those mentioned in Example I for the reaction of the emulsion polybutadiene with sulphur dioxide.

Immediately after their production the threads obtained in either case were stretched so as to obtain an elongation at rupture of about 30%. To test the chemical stability the threads were heated during 8 hours at 125° C. in air, after which the elongation at rupture was again determined.

The elongation at rupture of the sodium polybutadiene-$SO_2$ had decreased from 30% to 4%, which indicates that the material had become practically rigid; this considerable change is probably due to interreaction of unsaturated side chains. The elongation at rupture of the emulsion polybutadiene-$SO_2$ had decreased only from 28% to 21%.

EXAMPLE VI

For comparison in this example the results are given which were obtained when use was made of polybutadiene which had been prepared by polymerization in solution using sodium as a catalyst.

The polymerization was carried out in glass tubes which could stand high pressure. The tubes were partially filled with a liquid mixture of butadiene and toluene after which 1-2% of sodium wire was added.

The air was expelled by vapours of butadiene and the tubes were sealed. The polymerization was carried out at elevated temperature. Heating was continued until the polymerization was substantially complete. The polymerization took 60 hours at 40° C., 10 hours at 60–65° C. or 4½ hours at 80–110° C.

A 6% solution of the polybutadiene in toluene was activated by the addition of tetraline hydroperoxide and extruded through narrow openings into a solution of sulphur dioxide in a mixture of ethanol and water. The relative proportion of ethanol and water was 4:1 by volume.

Table VII gives the varied conditions of both the polymerization and the subsequent reaction of the polybutadiene with sulphur dioxide and also the results.

The conditions of reaction with sulphur dioxide were similar to those which yield high sulphur contents and excellent mechanical properties if emulsion polybutadiene is used as initial material. Nevertheless, the thread formation, if any, was very defective and the sulphur contents of the products were generally poor.

It should be noted that when using emulsion polybutadiene (prepared at 45° C.) the addition of 5% tetraline hydroperoxide (or about 2.5% cumene hydroperoxide) is sufficient to achieve a substantial saturation with sulphur dioxide, that is to say, a sulphur content of the product of 19% (temperature 20° C., concentration of the sulphur dioxide solution 200 grammes per litre).

TABLE VII

| Conditions of preparing polybutadiene | | Conditions of reaction of polybutadiene with $SO_2$ | | | Results | |
|---|---|---|---|---|---|---|
| Relative proportion butadiene: toluene, by weight | Temperature, °C. | Percent tetraline hydroperoxide on weight of polymer | Concentration of $SO_2$, grammes per litre | Temperature, °C. | Percent sulphur in product | Remarks |
| 70:30 | 40 | 5 | 150 | 20 | 6.7 | Thread formation very defective. |
| 70:30 | 40 | 10 | 150 | 20 | 11.6 | |
| 70:30 | 40 | 25 | 150 | 20 | 16.1 | |
| 70:30 | 40 | 50 | 150 | 20 | 18.0 | |
| 70:30 | 60– 65 | 8.5 | 150 | 20 | 11.6 | |
| 70:30 | 60– 65 | 8.5 | 200 | –7 | 8.2 | |
| 70:30 | 60– 65 | 21.2 | 200 | 20 | 15.4 | No threads formed. |
| 70:30 | 60– 65 | 21.2 | 200 | –7 | 13.6 | |
| 70:30 | 80– 90 | 10 | 200 | 20 | 4.0 | |
| 70:30 | 80– 90 | 25 | 200 | 20 | 10.0 | |
| 70:30 | 80–110 | 25 | 200 | 20 | 7.6 | |
| 70:30 | 80–110 | 25 | 200 | –7 | 4.5 | |
| 60:40 | 40 | 25 | 150 | 20 | 9.9 | |
| 70:30 | 60– 65 | ¹100 | 200 | 20 | 20.7 | Very weak threads which could not be stretched. |

¹ In this experiment cumene hydroperoxide was used in the quantity indicated instead of tetraline hydroperoxide.

EXAMPLE VII

As initial material polybutadienes were used which were obtained by polymerization in solution with peroxides as polymerization catalysts.

The polymerization was carried out in pressure-proof glass tubes. The tubes were partially filled with a mixture of butadiene and toluene in the proportion of 9:1 (by weight) and 1% of the catalyst was added. The air was expelled by vapours of butadiene and the tubes were sealed.

The tubes were heated at 80° C. during 192 hours, after which the conversion amounted to 34%.

A 6% solution of the polybutadiene in toluene to which tetraline hydroperoxide had been added was extruded into a solution of sulphur dioxide in a mixture of ethanol and water (relative proportion of ethanol and water 4:1 by volume). The concentration of sulphur dioxide was 200 grammes per litre, the temperature –7° C. Other conditions and the results of the experiments are tabulated below.

TABLE VIII

| Catalyst used for preparing polybutadiene | Percent tetraline hydroperoxide used in reaction of polybutadiene with $SO_2$, calculated on weight of polymer | Percent sulphur in product | Remarks |
|---|---|---|---|
| Benzoylperoxide | 23.0 | 1.2 | No threads formed. |
| Cumene hydroperoxide | 19.8 | 2.0 | |

EXAMPLE VIII

Polybutadienes were prepared in solutions, using aluminium chloride as a catalyst. Specific conditions were chosen in accordance with the examples of U. S. Patent specification 2,440,494.

No threads were formed when solutions of the polybutadienes so obtained, to which solutions tetraline hydroperoxide had been added, were extruded into solutions of sulphur dioxide (concentrations of tetraline hydroperoxide 15 or 25% calculated on the weight of polybutadiene, temperatures in either case: —7° C. or 20° C., concentration of sulphur dioxide: 200 grammes per litre, other conditions as indicated in Example VI).

EXAMPLE IX

Polybutadiene prepared by polymerization without a diluent with 2% sodium at a temperature of 80°–100° C., was reacted with sulphur dioxide under conditions as indicated for this reaction in Example VIII. No threads were formed.

General

Among the activators which must be added to polybutadiene or to solution thereof previous to the extrusion, hydroperoxides are preferred. Most active hydroperoxides are tetraline hydroperoxide, decaline hydroperoxide, cumene hydroperoxide, triphenyl methyl hydroperoxide, diethylbenzene hydroperoxide, cyclohexene hydroperoxide and methylcyclohexene hydroperoxide. Among oxygen yielding compounds other than hydroperoxides to be used as activators with respect to the reaction in question, peroxides such as benzoylperoxide are mentioned. Among the ethers which must be added if oxygen yielding compounds other than hydroperoxides are used, cyclic ones such as dioxane are preferred.

Suitable solvents for the butadiene are various aromatic hydrocarbons and also ethers such as dioxane. The same solvents may be applied in the solutions of sulphur dioxide. Preferred solvents for sulphur dioxide, however, are mixtures of a lower alcohol, such as methanol, ethanol or propanol, with water. It is also possible, although not preferred, to use a solvent for sulphur dioxide which solvent is not completely miscible with the solvent in which the polybutadiene is dissolved. Where in this specification or in the appending claims reference is made to "solutions which are completely miscible with each other" solutions are meant, which on being mixed, do not form a system of two liquid phases.

Products of good quality can also be obtained when together in one solution with emulsion polybutadiene also plasticized rubber or limited quantities of unsaturated compounds of low molecular weight, such as 1.5-hexadiene, allyl alcohol or diallyl phthalate, are reacted with sulphur dioxide.

For detailed description of spinning processes reference is made moreover to U. S. Patents No. 2,185,656, issued January 2, 1940, and No. 2,198,927, issued April 30, 1940.

We claim as our invention:

1. In a process for preparing filamentary products, the steps comprising forming a solution containing polybutadiene prepared by emulsion polymerization together with a hydroperoxide in an amount sufficient to fully activate said polybutadiene as regards reaction with sulphur dioxide, spinning said solution into a coagulating bath containing at least 60 grams of available sulphur dioxide per liter wherein the activated polybutadiene reacts with sulphur dioxide to form an insoluble, filamentary reaction product containing an amount of sulphur dioxide equivalent to from 18 to 22% sulfur on a dry weight basis, removing said filamentary product from the coagulating bath and drying the same.

2. The filamentary product produced by the method of claim 1.

3. A process as defined in claim 1 wherein the polybutadiene was prepared in an emulsion at a temperature below 25° C.

4. A process as defined in claim 1 wherein the coagulation bath is maintained at a temperature between +12° C. and +30° C.

5. A process as defined in claim 1 wherein the coagulation bath contains from 60 grams to 120 grams of available sulphur dioxide per liter.

6. A process as defined in claim 1 wherein the hydroperoxide is tetraline hydroperoxide and the said tetraline hydroperoxide is used in an amount equal to at least 5% by weight of the quantity of polybutadiene used in the process.

GOTTFRIED ERNST RUMSCHEIDT.
JOHAN MICHAEL GOPPEL.

REFERENCES CITED

The following references are of record in the file of this patent:

UNITED STATES PATENTS

| Number | Name | Date |
|---|---|---|
| 1,896,491 | Luther | Feb. 7, 1933 |
| 2,288,982 | Waterman | July 7, 1942 |
| 2,376,390 | Semon | May 22, 1945 |
| 2,469,847 | Rumscheidt | May 10, 1949 |